United States Patent
Pompei et al.

[19]

[11] Patent Number: 6,070,630
[45] Date of Patent: Jun. 6, 2000

[54] TIRE HAVING SILICA REINFORCED RUBBER TREAD WITH CARBON BLACK REINFORCED RUBBER ENVELOPE

[75] Inventors: Manuela Pompei, Kayl, Luxembourg; Ghislain Adolphe Léon Thise, Wardin, Belgium; Jean Bergh, Vianden, Luxembourg; Georges Clement, Martelange, Belgium

[73] Assignee: The Goodyear Tire & Rubber Company, Akron, Ohio

[21] Appl. No.: 08/686,615

[22] Filed: Jul. 19, 1996

Related U.S. Application Data

[60] Provisional application No. 60/001,246, Jul. 20, 1995.

[51] Int. Cl.[7] .............................. B60C 1/00; B60C 11/00; B60C 19/08
[52] U.S. Cl. .................................. 152/152.1; 152/209.5; 152/DIG. 2
[58] Field of Search .................. 152/209 R, 209 D, 152/151, 152.1, DIG. 2, 209.5, 905; 524/492, 493

[56] References Cited

U.S. PATENT DOCUMENTS

| | | | |
|---|---|---|---|
| 2,329,332 | 9/1943 | Bull et al. | 152/152.1 |
| 2,339,546 | 1/1944 | Hanson | 152/DIG. 2 |
| 3,768,537 | 10/1973 | Hess et al. | 152/209 R |
| 3,884,285 | 5/1975 | Russell et al. | 152/209 R |
| 5,225,011 | 7/1993 | Takino et al. | 152/209 R |
| 5,518,055 | 5/1996 | Teeple et al. | 152/152.1 |
| 5,718,781 | 2/1998 | Verthe et al. | 152/152.1 |
| 5,872,178 | 2/1999 | Kansupada et al. | 152/152.1 |
| 5,942,069 | 8/1999 | Gerresheim et al. | 152/152.1 |

FOREIGN PATENT DOCUMENTS

| | | | |
|---|---|---|---|
| 341187 | 11/1989 | European Pat. Off. | 152/209 R |
| 658452 | 6/1995 | European Pat. Off. | 152/152.1 |
| 681931 | 11/1995 | European Pat. Off. | 152/152.1 |
| 705722 | 4/1996 | European Pat. Off. | 152/152.1 |
| 718126A2 | 6/1996 | European Pat. Off. . | |
| 718127 | 6/1996 | European Pat. Off. | 152/152.1 |
| 732229 | 9/1996 | European Pat. Off. | 152/152.1 |
| 732229A1 | 9/1996 | European Pat. Off. . | |
| 754574A2 | 1/1997 | European Pat. Off. . | |
| 793507 | 1/1936 | France | 152/DIG. 2 |
| 52-47202 | 12/1977 | Japan | 152/152.1 |
| 3-7602 | 1/1991 | Japan | 152/209 R |
| 3-65406 | 3/1991 | Japan | 152/209 R |
| 8-244409 | 9/1996 | Japan | 152/152.1 |
| 597008 | 3/1978 | Switzerland | 152/152.1 |
| 544757 | 4/1942 | United Kingdom | 152/152.1 |

OTHER PUBLICATIONS

Copy of the European Search Report.

*Primary Examiner*—Steven D. Maki
*Attorney, Agent, or Firm*—Henry C Young, Jr.

[57] ABSTRACT

The invention relates to a rubber tire composed of carbon black reinforced rubber carcass and having a rubber tread which is composed of a unitary, co-extrusion of tread cap, base and miniwings and, wherein a portion of the miniwings extend as a thin layer over a portion of the tread cap's outer surface to create a path of reduced electrical resistivity.

2 Claims, 5 Drawing Sheets

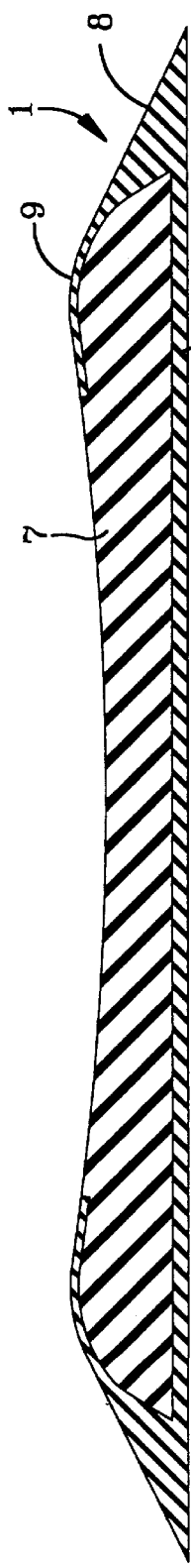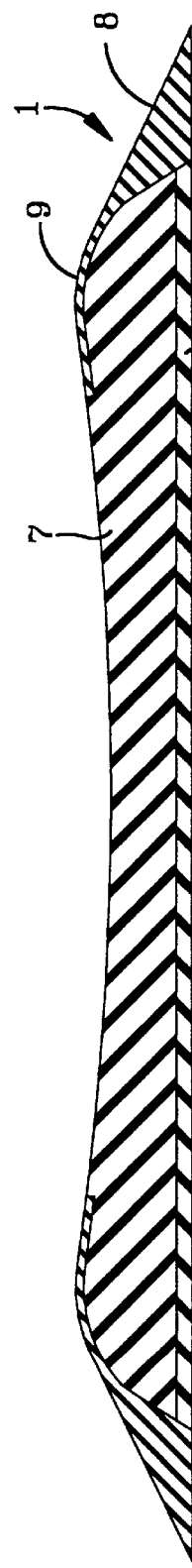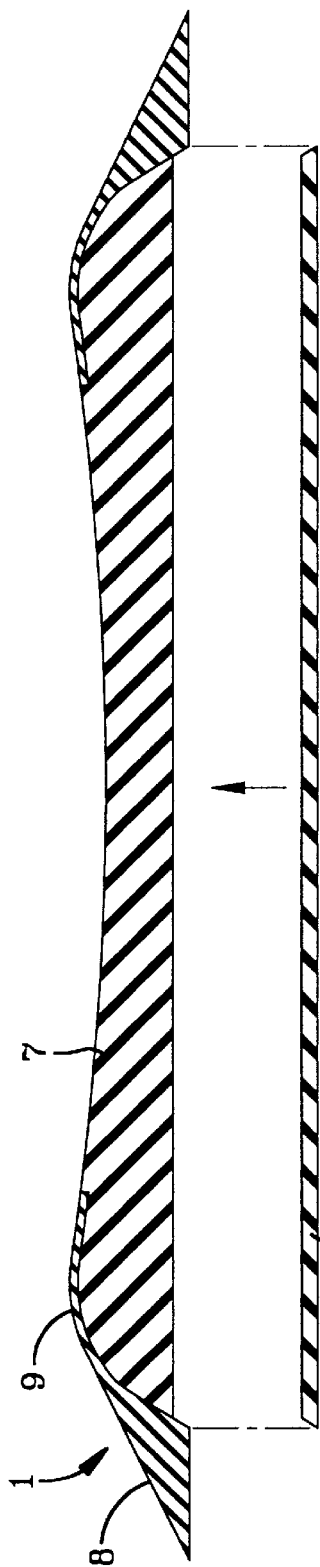

TIRE HAVING SILICA REINFORCED RUBBER TREAD WITH CARBON BLACK REINFORCED RUBBER ENVELOPE this application claims the benefits of U.S. Provisonal Application No. 60/001,246 filed Jul. 20, 1995.

FIELD

This invention relates to a rubber tire with carbon black reinforced carcass and a rubber tread construction composed of (i) a tread containing quantitative electrically non conductive filler pigment such as, for example, silica, reinforcement and a minimal amount of electrically conductive carbon black, if any, said tread having (ii) an integral rubber layer of consistent, or continuous composition which at least partially and preferably substantially envelops said tread and which is quantitatively reinforced with electrically conductive carbon black.

The said tread construction may be of a dual extrusion of said tread and said layer.

In one aspect, the invention also relates to a rubber tire with sulfur vulcanized, electrically conductive carbon black reinforced carcass and sulfur vulcanized tread of a cap/base-wing construction in which the tread cap is quantitatively reinforced with electrically non conductive pigment such as, for example, silica, and with a minor amount of carbon black, if any, and the underlying base and exterior wings are of a rubber layer of varying thickness and of consistent, or continuous rubber composition which also extends from the wing over at least a portion of the tread which is intended to be ground-contacting.

The said rubber layer connects with at least one other carbon black reinforced component of the tire carcass to provide a continuous path of reduced electrical resistance from said outer tread surface to the bead portion of the tire carcass. Such reduced electrical resistance is in comparison to electrical resistance between the silica reinforced tire tread itself and the bead portion of the tire carcass.

BACKGROUND

Pneumatic rubber tires are conventionally prepared with a rubber tread which can be a blend of various rubbers which are, typically, sulfur curable or sulfur cured as the case may be, diene based elastomers. The tire rubber, including its tread portion, is typically reinforced with carbon black reinforcing filler and with a minimal, if any, of silica.

In one aspect, treads of rubber tires are often prepared of a cap/base construction in which the outer portion of the tread is the cap and the underlying part of the tread between the tread cap and the supporting tire carcass, is its base. The cap portion is usually designed to be ground-contacting and, thus, have associated properties and the base portion generally overlays the tire carcass and is usually designed to support the cap, therefore, not to be ground-contacting. Such cap/base constructions are well known to those skilled in the art.

In one aspect of this invention, a tread of cap/base construction is contemplated in which, for the purposes of this invention, the tread cap is substantially reinforced with silica, with a minimal amount of carbon black, usually less than about 15 phr of carbon black, and the underlying tread base is substantially carbon black reinforced.

In one aspect, the tire tread, or tread base in the case of a cap/base construction, may be presented in a form of a wing extension on each side of the tread in which the tread wings extend outward and over a portion of the outer surface of the tire sidewall of the tire carcass. Such tread wings may sometimes be referred to as "miniwings". Thus, the tire construction, insofar as the tread construction is concerned, is a tread-over-sidewall construction.

It is to be appreciated that conventional tread, tread cap/base and tread wing constructions are typically prepared by an extrusion process where, in the case of a cap/base-wing construction for example, the cap, base and wings are extruded together to form a one piece, unified extrusion. Such tread extrusion processes are well known to those having skill in such art. However, conventionally in a tread-over-sidewall tire construction, the tread wings are of a rubber composition approximately the tire sidewall composition, primarily for tread-to-sidewall compatibility.

In the practice of this invention, usually, the tread cap is of one rubber composition, and the tread base and the tread wings are of individual differing rubber compositions. Indeed, the tread wings are more conventionally of a rubber composition somewhat similar to the sidewall of the tire carcass. The tread cap is typically of a composition designed to be road contacting and thus have appropriate traction, rolling resistance and treadwear characteristics. The tread base may be of a rubber composition, for example, designed to assist the tread cap in enhancing tire rolling resistance but to not be as effective as the tread cap in promoting traction and treadwear because it is not intended that the tread base be normally designed to be road contacting.

For the purposes of this presentation, a tire is viewed as being composed of a circumferential tread and supporting carcass therefor. As hereinbefore discussed, the tread may be composed of a tread cap, tread base and, optionally, tread wings. The carcass is viewed as being composed of relatively conventional elements which include, but are not limited to, electrically conductive carbon black reinforced rubber sidewalls (although a portion of an outer surface of the sidewalls may be colored by an appropriate pigment such as, for example, white titanium dioxide and, thus, not contain carbon black), beads, apex, innerliner and the supporting carcass plies, including fabric reinforced plies. A shoulder region of a tire is considered as including a portion of the tire in which its sidewall meets its tread. It is not normally a sharp line of demarkation and its actual position may vary somewhat from tire to tire. The bead portion of the carcass is typically composed of a relatively inextensible bundle of wires which is encased in carbon black reinforced rubber and is designed to contact a metal rim on which the tire itself is mounted to form a tire/rim assembly which itself is conventionally adapted to be mounted on a vehicle, particularly a wheel of a vehicle. The rim is typically steel or aluminum, or alloy thereof and is, thus, electrically conductive since the metal is considered as having a very low resistance to flow of electricity. The term "metal", as used herein for the metal rim, is intended to mean electrically conductive metals such as, for example, the aforesaid steel and aluminum rims as would be understood by those having skill in such art.

It is acknowledged that, in some tire constructions, carbon black reinforced rubber components such as, for example, components which are sometimes known as chippers and chafers may be positioned in the bead area or region of the tire construction to assist in cushioning the bead component against the metal rim. In the context of this description, a reference to the aforesaid bead component of the tire carcass is intended to include such other associated rubber components unless otherwise indicated, and thereby are a part of the tire carcass.

In practice, as is well known to those having skill in such art, the tire, which may sometimes be referred to as a pneumatic tire, is mounted on the metal rim and air pressure is applied to the cavity enveloped by the metal rim and the pneumatic tire carcass.

The hereinbefore construction elements, or components, of a pneumatic tire and tire carcass, as well as such tire/rim assembly, are also well known to those familiar with such tire art.

It is important to appreciate that uncompounded rubber by itself is generally considered as being, substantially, an electrical insulator or, in other words, a rather poor conductor of electricity.

A carbon black reinforced rubber vehicular tire, while still providing a degree of resistance to flow of electricity, has a considerably higher electrical conductivity, or lower resistance to flow of electricity, than rubber without the carbon black reinforcement.

It is considered herein that a continuous relatively low electrical resistance path is created between the electrically conductive metal rim of a tire/wheel (tire/rim) assembly to the outer tire tread surface, and thence to the ground via the carbon black reinforced rubber of the tire, including its ground-contacting tread component, for such a tire/rim assembly mounted on a vehicle which is intended to travel over the ground.

In this manner, it is considered herein that potential electrical energy, which may potentially be created by components of or within a moving vehicle as its rotating wheels and associated tire/rim assemblies as they travel over the ground, is dissipated from the rim of a tire/rim assembly on the vehicle to the ground via the carbon black reinforced rubber path of the tire carcass and tread, or tread cap of a tread of a cap/base construction, which tread or tread cap, as the case may be, is normally the outer rubber surface of the tire intended to be ground-contacting.

Thus, in one aspect, it is considered herein that the carbon black reinforced rubber of the tire carcass and associated tread normally provide a sufficiently low electrical resistance path to dissipate potential electrical energy and, thereby, retard or eliminate static electrical charge from building up and/or accumulating under dynamic conditions of a rotating tire on a vehicle traveling across the ground.

Alternatively, in practice, carbon black reinforced rubber tires may sometimes be prepared which have outer rubber treads designed to be ground-contacting which are quantitatively reinforced with silica or other non electrical conductive fillers and, thus, contain only minimal amounts such as, for example, 15 phr or less, or sometimes even less than 10 phr, of carbon black.

In such silica reinforced tire tread construction, although the various other rubber components of the tire, namely, the aforesaid overall tire carcass, are quantitatively reinforced with carbon black with a minimal amount, if any, of silica and, thus, may have a relatively low electrical resistance on the order of one megohm or less whereas, the silica reinforced tread itself may have a substantially high electrical resistance on an order of at least 20,000 megohms and, thus, such tread creates a degree of electrical insulating effect between the tire carcass and ground. Such a tire construction has a substantially less tendency to dissipate static electricity from the tire to the ground, and particularly from the metal rim of a tire/rim assembly to the outer surface of the tire tread and thence to the ground, which may be generated by a dynamic condition of the rotation of the tire on a moving vehicle. Accordingly, a potential for static electricity to build-up, or increase, is considered to be higher for such a tire construction with a silica reinforced tread than for a similar tire with a carbon black reinforced tread.

Therefore, it is desirable to provide a suitable path of relatively low electrical resistance between the tire bead portion and the tread outer surface for such a tire having a quantitative silica reinforced rubber tread and minimal, if any, carbon black reinforcement.

While the dissipation of generated electrical energy may not be completely understood, it is believed that, insofar as a vehicular tire is concerned, electricity may be transmitted primarily from the metal rim, of steel or aluminum, for example, thence on or through the carbon black reinforced rubber surface of the tire carcass to the outer surface of a carbon black reinforced rubber tread and thence to the ground.

It is recognized that a thin outer rubber coating, if applied to a tire tread surface, will relatively quickly wear away as the tire is used, leaving the coating on surfaces within the grooves in a tire tread which typically has a lug/groove design or configuration. Thereby, it is considered herein that only a very small portion of the coating, namely the thickness of the coating on the walls of the tire tread lugs, is actually available to be directly presented to, or contact, the ground to facilitate a relatively low electrical resistance from the tire to the ground for a tire with tread which is quantitatively reinforced with silica.

It is, therefore, considered herein that in order to be practical, the carbon black reinforced tread outer top cap layer over the outer surface of the silica reinforced rubber tread should be a thin carbon black-containing rubber layer integral with the tread and, thus, having good adhesion to the tread, particularly within the tire tread grooves including the lug walls, and present a sufficient cross-sectional thickness, or surface area, to the ground of the outer top cap layer on the tire lug walls to be effective after the said layer wears away from the outer surface of tread lugs.

In one alternative aspect, for a tire tread conventionally configured with a combination of lugs and grooves, it is desired that the grooves connect directly or indirectly with the carbon black reinforced rubber shoulder of the tire, the area of the tire where the sidewall and tread meet, in order for the carbon black reinforced outer cap layer to more fully connect with the carbon black reinforced rubber portion of the tire, namely, the tire carcass and including the tread base in the case of a tread cap/base construction.

In a tire tread cap/base-wing construction, which is well known to those having skill in such art, and for the purposes of this invention, it is envisioned that the cap is substantially silica reinforced with a minimal amount of carbon black and its base and wings are substantially carbon black reinforced.

In practice, it is desirable that the outer tread top cap layer, wings and tread base, if any, (i) contain a quantitative amount of carbon black and are of a relatively low electrical resistance to aid in dissipation of electrical energy under the aforesaid conditions, (ii) and are co-vulcanized with the rubber tire tread in order that they be integral with the tread and the walls of grooves of a tire tread configuration composed of lugs and grooves It is expected that the outer cap rubber composition will wear off of the outer surface of tire tread lugs during use of the tire so that the cross-section, or thickness, of the outer cap layer on the lug walls is relied upon to present a path of relatively low electrical resistance from the tread to the ground.

As used herein, the terms "quantitatively reinforced with silica", "quantitative silica reinforced rubber" and the like are generally used in conjunction with a tire tread, and with a rubber tire tread cap, in a tread cap/base construction, which contains about 30 to about 100, sometimes preferably about 30 to about 90 phr, of silica, and which may also optionally contain carbon black in which the carbon black is present in not more than about 20 phr. Often it is preferred that the ratio of silica to carbon black is at least 2/1 and sometimes at least 10/1.

By the term "carbon black" reinforced, it is meant that the rubber components of the tire carcass rubber which are carbon black reinforced, contain a quantitative amount of carbon black reinforcement, normally at least 25 phr, and a minimal amount, if any, of silica and the weight ratio of carbon black to silica is at least 5/1.

While it is recognized that most carbon blacks are electrically conductive to some degree, and that most carbon blacks will make most rubber compositions electrically conductive, or at least to some degree if they contain enough of the carbon black, some carbon blacks are more electrically conductive than others. For convenience herein, by the term "electrically conductive carbon black" is meant a carbon black characterized by having a BET surface area of at least 30 gm/cm$^2$. The BET surface area of carbon black is a well known technique of characterizing such surface area by a nitrogen absorption method.

The term "consistent, or continuous, rubber composition" where used herein is intended to mean that the rubber composition is, basically, of the same rubber composition throughout the designated rubber components. In particular, it is intended in the practice of this invention that the tread miniwings and tread outer cap layer are of the same rubber composition and are of a unitary, or continuous composition and component or construction. Thus, in one sense, the outer tread cap layer is simply an extension of the tread miniwings. In another aspect of the invention it is intended that the tread miniwings, tread outer cap layer and the tread base, when a tread base is used, are of the same rubber composition and are of unitary construction. By the term unitary construction it is intended to mean that all of such tire tread components are joined together in a single, unitary construction.

The term "phr" as used herein, and according to conventional practice, refers to "parts of a respective material per 100 parts by weight of rubber". In the description herein, rubber and elastomer are used interchangeably.

In the description herein, the term "vulcanized" or "vulcanizable", may, on occasion, be used interchangeably with the terms "cured" and "curable".

SUMMARY AND PRACTICE OF THE INVENTION

In accordance with this invention, a pneumatic tire is provided which is composed of a carbon black reinforced rubber carcass having two individual sidewalls, and two spaced apart bead portions and a circumferential rubber tread composed of a tread and a pair of spaced apart tread wings each individually positioned adjuxtapositioned to and extending axially outwardly from opposite sides of the tread to overlap at least a portion of the outer surface of each of the two sidewall portions of the tire carcass, wherein said tread is comprised of dual-extruded sulfur vulcanizable rubber laminae composed of (i) a tread, and (ii) said tread wings with an outer top tread cap layer extending from each of the said tread wings and integral with and covering at least a portion of the outer surface of the tread designed to be ground-contacting; wherein said tread contains about 30 to about 100 phr of precipitated silica and, optionally, up to about 20 phr of carbon black; and wherein said tread wings and tread outer top cap are of a unitary rubber composition and contain about 25 to about 100 phr of carbon black having a BET value in a range of about 30 to about 1000 m$^2$/g.

The tire is vulcanized whereby the said tread top cap is co-vulcanized and integral with said tread and tread wings and wherein said tread has a lug and groove configuration.

The tire can be suitably characterized in that said tire without said tread top cap layer has an electrical resistance greater than 20,000 megohms and said tire with said tread top cap has an electrical resistance of less than 100 megohms, according to a loaded electrical resistance test which, for convenience is referred to herein as Test GT-L and which is hereinafter described, and where said top tread cap layer on the walls of the lugs of the tread has a thickness in a range of about 0.01 to about 0.5 mm.

In one aspect of the invention, the integral top tread cap layer may circumferentially cover the peripheral outer surface of each side of the outer tread surface adapted to be ground-contacting and covers about 20 to about 100 percent of the total outer surface of the tread, including the walls of the tread lugs within the tread grooves.

In further accordance with this invention, said substantially encompassing, continuous rubber layer of consistent, or continuous, unitary composition is of a varying thickness and consists of (i) an optional underlying tread base having a thickness in a range of about 0.1 mm to about 2 mm, (ii) two miniwings, each individually positioned adjuxtapositioned to and outboard of said tread cap and optional tread base and (iii) an outer top cap layer having a thickness in a range of about 0.01 mm to about 0.5 mm extending from said miniwings over at least a portion of the outer surface of the tread cap intended to ground-contacting, where said miniwings contact the sidewall of the tire carcass; wherein said tread cap contains about 30 to about 100 phr of precipitated silica and, optionally, up to about 20 phr of carbon black; and wherein said rubber layer contains about 25 to about 100, preferably about 35 to about 90, phr of carbon black having a BET value in a range of about 30 to about 1000 m$^2$/g.

In the further practice of the invention, a method is provided of preparing a tire composed of a vulcanized tire assembly of (A) a carbon black reinforced, sulfur vulcanizable rubber carcass having two individual sidewalls, and two spaced apart bead portions and (B) a sulfur vulcanizable rubber tread structure, intended to be ground-contacting, positioned circumferentially around and integral with the outer circumferential surface of said carcass; wherein said tread structure is composed of a tread and a pair of spaced apart tread wings, each wing individually positioned adjuxtapositioned to and extending axially outwardly from opposite sides of the tread to overlap at least a portion of the outer surface of each of the two sidewall portions of the tire carcass, which comprises the steps of (i) dual-extruding a sulfur vulcanizable rubber tire tread construction laminae composed of (a) said tread rubber composition portion and (b) said tread wing rubber composition portions with an outer top tread cap layer extending from each of the said tread wing portions and covering at least a portion of the outer surface of the tread intended to be ground-contacting; wherein said tread wing portions and top tread cap layer are of a unified rubber composition; wherein said tread contains about 30 to about 100 phr of precipitated silica and/or non-conductive reinforcing fillers and, optionally, up to about 20 phr of carbon black; and wherein said tread wings and tread outer top cap are of a unitary rubber composition and contain about 25 to about 100 phr of carbon black having a BET value in a range of about 30 to about 1000 $m^2/g$; (ii) applying said dual-extruded tread structure circumferentially onto and around the circumferential outer surface of said carcass to form said tire assembly thereof, and (iii) sulfur vulcanizing said tire assembly in a suitable mold under conditions of elevated temperature to form a vulcanized tire.

Such method is also provided in which said tread structure is of a cap/base construction of a tread cap portion and a tread base portion in which said tread cap is the said tread rubber composition; wherein the tread base underlies said tread cap and extends to and contacts said tread wings in which method the tread structure is prepared by dual extruding (i) the tread cap rubber composition portion and (ii) the said tread wings, said outer top tread cap layer extension of said wings and tread base rubber composition portions; wherein said tread wings, outer top tread cap layer and tread base is of a unitary rubber composition substantially enveloping said tread cap portion.

Such method is further provided in which said tread base is of a rubber composition differing from the unitary rubber composition of said tread wings and extended top tread layer wherein said tread base portion is tri-extruded with said tread cap and said tread wing and said top tread layer portions to form said tire tread construction prior to preparing and vulcanizing said tire assembly.

Such method is also provided in which said tread base is of a rubber composition differing from the unitary rubber composition of said tread wings and extended top tread layer wherein said tread base portion is laminated to said dual extruded tread cap and said tread wing and said top tread layer portions to form said tread construction prior to preparing and vulcanizing said tire assembly.

In one aspect, it is sometimes preferable that, for the tire tread cap, the weight ratio of silica to carbon black, if carbon black is used, is at least about 2/1 and preferably at least 10/1.

Such tire is vulcanized whereby the said rubber layer is co-vulcanized and integral with said tread cap and wherein said tread has a lug and groove configuration.

In one aspect of the invention, while the said rubber layer substantially encompasses the tread, such rubber layer may cover up to thirty percent of the outer surface of the tread cap intended to be ground-contacting, although if desired, such rubber layer may cover from twenty to about 100 percent of the outer surface of the tread intended to be ground-contacting.

In one aspect of the invention, the said tread construction is a dual extrusion of (i) said tread rubber, and (ii) said tread wings and outer tread layer.

Such tire is vulcanized whereby the said rubber layer is co-vulcanized and integral with said tread cap and wherein said tread cap has a lug and groove configuration.

It is important to appreciate that the tire construction of this invention does not rely upon an electrically conductive strip of rubber embedded within the tread itself but, instead, relies upon an extension of the tread miniwings in a tire construction of tread-over-sidewall configuration.

The referenced tread components, namely the tread, tread cap, tread base and miniwings are tread components well known to those skilled in such art. It is considered herein to be novel that the tread, miniwings and outer rubber layer over at a least a portion of the outer surface of the tread cap is of a consistent, or continuous composition, particularly when taken that the tread has a minimal amount of carbon black reinforcement and the rubber layer has a quantitative amount of carbon black reinforcement.

By the terms "co-extrusion" and "co-extruded" it is meant that rubber components are extruded through the same die and not simply separately extruded and, then joined together.

In the practice of this invention, the said tread laminae are formed by co-extrusion at a temperature in a range of about 80° C. to about 150° C., more preferably about 100° C. to about 140° C.

The hot co-extrusion of the tread components is particularly beneficial in creating an integral structure of the laminae not otherwise readily obtainable. In general, co-extrusion of tread cap, tread base and tread wings (sometimes referred to as miniwings) are well known to those skilled in such art.

The outer tread top cap layer typically has a vulcanized thickness on the outer surface of the tread in a range of about 0.01 to about 0.5 mm, particularly as being on the walls of the lugs of a tread of a typical lug and groove construction, or design. While it is understood that such thickness will be expected to vary between the layer on the walls of the lugs and the bottom of the grooves the average thickness is significant as hereinbefore pointed out.

The outer tread top cap layer is considered to be integral with the tread in a sense that it is both co-extruded and co-vulcanized with the tread. Thus, the outer tread top cap layer is not a simple laminate formed by coating a relatively cold tread with a solvent based rubber composition or by applying a relatively cold pre-extruded rubber strip to a relatively cold tire tread, particularly at temperatures of less than about 50° C., and co-vulcanizing the assembly.

Having the aforesaid partially, or substantially, encompassing rubber layer of consistent composition to be formed by co-extrusion with the tread's cap in the tread cap/base construction, is considered herein to be a considerable advantage over applying a solvent based rubber coating over the tread cap or by forming a co-extrusion of the tread components of individually varying composition because (i) adhesion of the components of the laminate is considered herein to be better since they are created to form the extruded laminate in their hot, unvulcanized state, (ii) a better co-vulcanization is considered herein to take place, and (iii) a possibility of exposed surface contamination is reduced or eliminated.

Suitable electrically conductive carbon blacks contemplated for use in this invention are carbon blacks having sufficient surface area demonstrated by a BET value in a range of about 30 to about 1000 $m^2/g$. It is recognized that most carbon blacks are electrically conductive to some degree and that some are more electrically conductive than others. The BET method is used herein to indicate those carbon blacks which are believed to be more electrically conductive. It is recognized that most carbon blacks typically utilized for tire tread reinforcement purposes possess BET values which fall within this range. BET surface area values and method determination for carbon blacks are well known to those skilled in such art.

In practice, the tread of such tire has a lug and groove configuration.

By the term "co-vulcanized" it is meant that the co-extruded tread components are co-vulcanized together and with the rubber tire carcass. Such co-vulcanization is well known to those having skill in such art.

The resultant tire assembly is shaped and sulfur cured in a suitable mold to form a vulcanized tire.

While not limited thereto, various sulfur vulcanizable elastomers and combinations thereof may be used in the construction of various elements of the tire.

Elastomers contemplated include homopolymers and copolymers of conjugated diene hydrocarbons and copolymers of conjugated dienes and aromatic vinyl compounds such as, for example, styrene and alphamethylstyrene. Representative of various dienes are, for example, isoprene and butadiene. Representative of various elastomers are, for example, cis 1,4-polyisoprene (natural and synthetic), cis 1,4-polybutadiene, styrene/butadiene copolymers as emulsion polymerization prepared copolymers and as organic solution polymerization prepared copolymers, isoprene/butadiene copolymers, styrene/isoprene copolymers, 3,4-polyisoprene, relatively high vinyl polybutadiene containing about 30 to about 85 percent vinyl content and styrene/isoprene/butadiene terpolymers.

The tire is then constructed by building a co-extruded tread onto a rubber tire carcass. Such construction and building process are well known to those having skill in such art.

Tire assembly is vulcanized in a suitable mold under conditions of elevated temperature, for example, in a range of about 140° C. to about 180° C.

The co-vulcanized, carbon black reinforced, substantially encompassing rubber layer provides a path of relatively low electrical resistance, as compared to a silica reinforced tire tread and, thus, a path for dissipation of static electricity between the ground and the tire bead portion and thence the metal rim of the vehicular wheel on which the tire may be mounted.

After the tire tread, in service, becomes worn so that the rubber tread outer top cap layer is worn away from the outer surface of the lugs of a tire tread having a lug and groove configuration, the path for dissipation of static electricity is maintained by the outer tread top cap layer on the walls of the lugs of a tread of a lug/groove configuration.

The accompanying drawings are provided for further understanding of the invention, although it is not intended that the invention be limited to the presentation of the drawings. In the drawings:

FIG. 1 is a cross-sectional view of extruded, silica reinforced unvulcanized, sulfur curable rubber tread strips, showing a cap/base-wing construction, in combination with rubber layer of consistent composition which is quantitatively carbon black reinforced, is an extension of the tread base and substantially encompasses the tread cap. While a cap/base construction of the tread is depicted in FIG. 1 as well as the following FIGS, it is important to appreciate that the tread may simply be a tread without the tread base.

FIGS. 1A and 1B show the tread base to be of a rubber composition differing from the tread cap and tread wings which may be (1) tri-extruded with the tread cap, wings and outer tread cap layer as FIG. 1A or may be (2) applied by laminating separately to the aforesaid dual extruded tread construction as FIG. 1B.

Figure 2:
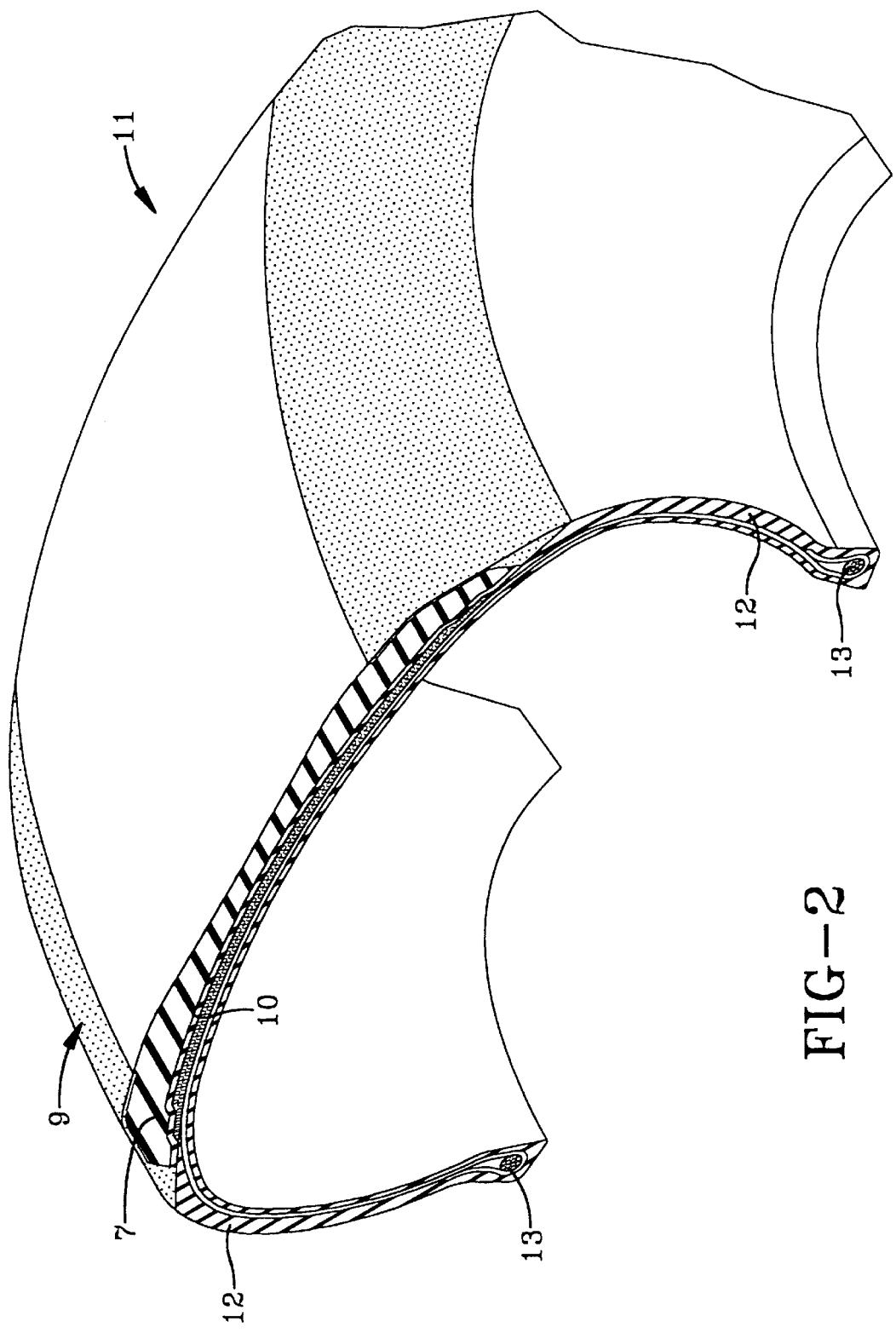
FIG. 2 depicts a cross-sectional, perspective view of a tire with a tread of cap/base construction and containing the said unvulcanized, co-extruded substantially encompassing rubber layer positioned as an assembly thereof on the tire carcass.

Referring to the drawings, a cross-section of co-extruded unvulcanized rubber treads (FIG. 1) is shown having portions which will become, after building the tire and upon shaping and vulcanizing the tire in a suitable mold, the tread cap 7 normally intended to be ground-contacting, and a substantially encompassing rubber layer of consistent, unitary and continuous rubber composition as the tread base 10 which supports the tread, connecting tread wings 8 and extension of said tread wings as a thin layer 9 over at least a portion of the outer surface of the tread cap which is intended to be ground-contacting.

For FIG. 1, between portions of the extrusion that will become the tread cap 7 and miniwings 8 adjacent the tread cap 7 and tread base 10 is the thin, dual-extruded rubber outer top cap layer 9 of rubber which contains a quantitative amount of carbon black and a minimal amount, if any, of silica.

While FIG. 1 depicts miniwings 8 as being an extension of the base 10 it is to be understood that the tread base 10 can be of a rubber composition different from that of tread wings 8 if the tread base is formed by a tri-extrusion or if it is laminated to the said dual extrusion, as hereinbefore described, although all of the miniwings 8 and tread base 10 are quantitatively carbon black reinforced rubber compositions.

The aforesaid tread wings, or miniwings, 8 are conventionally a structural part of, or extension of, the tread, or the tread base in a tread's cap/base construction. Miniwings for a tread cap/base construction are considered herein to be well known to those skilled in the tire building and manufacturing art.

All of the tread components, namely the tread base, tread cap, the outer integral top cap, and the miniwings, in general practice, extruded together in a multiplex extruder to form the tread strip construction. One important aspect of the invention is the use of a dual-extrusion to form the tread construction which may be preferably composed of only two rubber compositions. Such dual extrusion to form the said (i) tread and (ii) tread wings and associated extension thereof of the thin layer over the outer tread surface is believed to be novel and inventive, particularly where the tread itself is quantitatively silica reinforced and the aforesaid tread wings and associated thin rubber extension over the outer surface of the tread is quantitatively carbon black reinforced.

In practice, the optional rubber tread base 10 is quantitatively carbon black reinforced, as are the miniwings, and the rubber tread cap 7 is quantitatively silica reinforced and the aforesaid dual-extruded outer rubber top cap 9 is quantitatively carbon black reinforced.

A significant novelty is considered herein to be that the rubber layer composed of the tread wings, miniwings and outer tread layer, and optionally the tread base, are of an identical, unitary, consistent quantitatively carbon black rubber composition. It is acknowledged that such rubber layer is of a varying thickness to accommodate the thickness and contour requirements of the miniwings and outer tread layer and optional tread base.

In one aspect of the invention, as depicted in FIGS. 3, 4, 5 and 6 the dual-extruded outer tread layer portion of the said rubber layer may only partially cover the tread cap 7 namely, by extending, for example, from the tread wings to a location about 20 to about 80 percent of the distance from the inner edge of the tread wing to the centerline of the tire tread.

Figure 3:
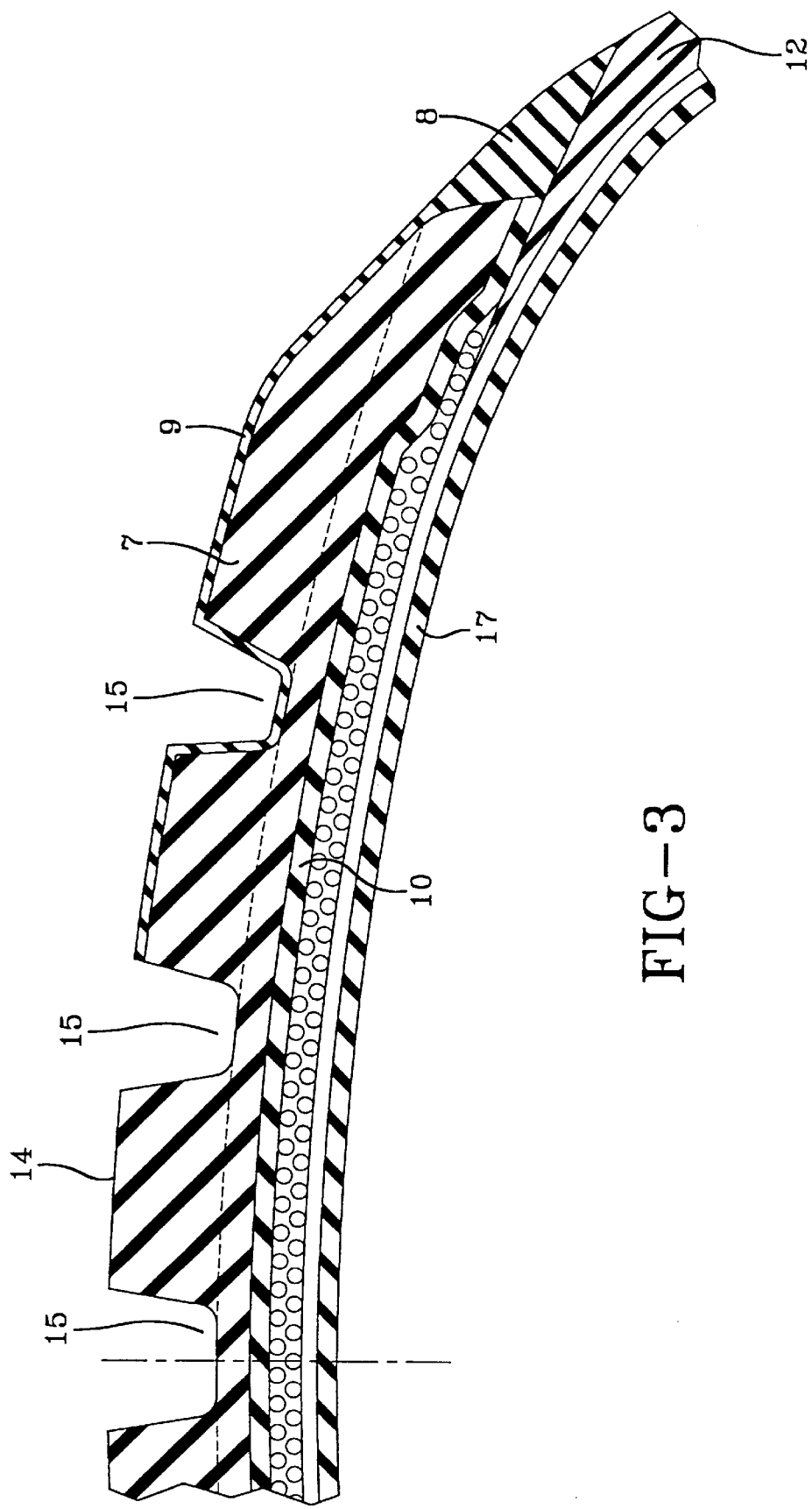
FIG. 3 is a cross-sectional view of a portion of a shaped and vulcanized tire in its tread region, showing the cap/base-wing tread construction with the associated co-extruded, substantially encompassing rubber layer, in which the tread's raised lug portions and recessed groove configuration is depicted.
Figure 4:
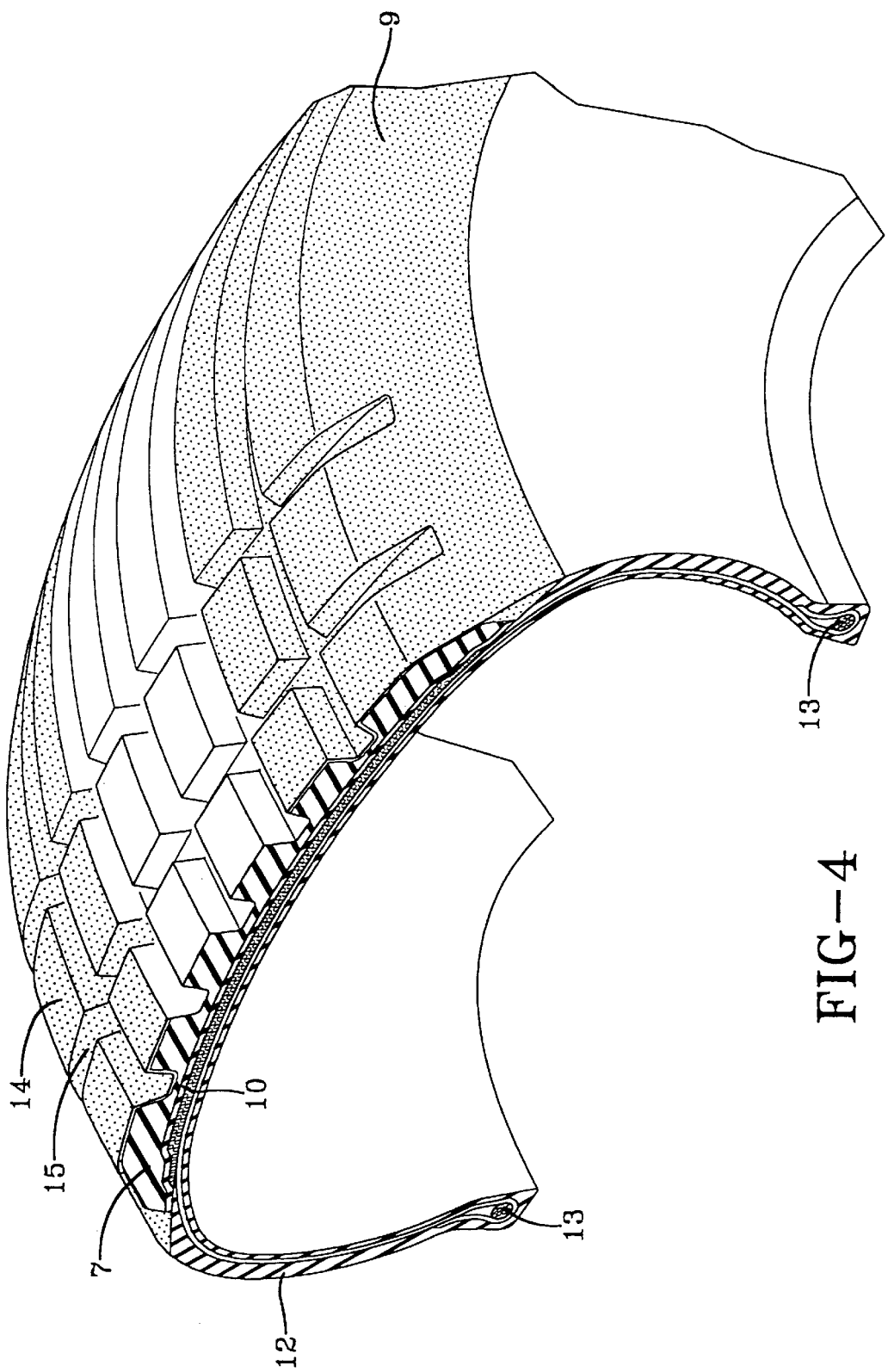
FIG. 4 is a cross-sectional, perspective view of a shaped and vulcanized tire showing the cap/base-wing tread construction, with the co-extruded, substantially encompassing rubber layer, together with the tread's lug and groove configuration.
Figure 5:
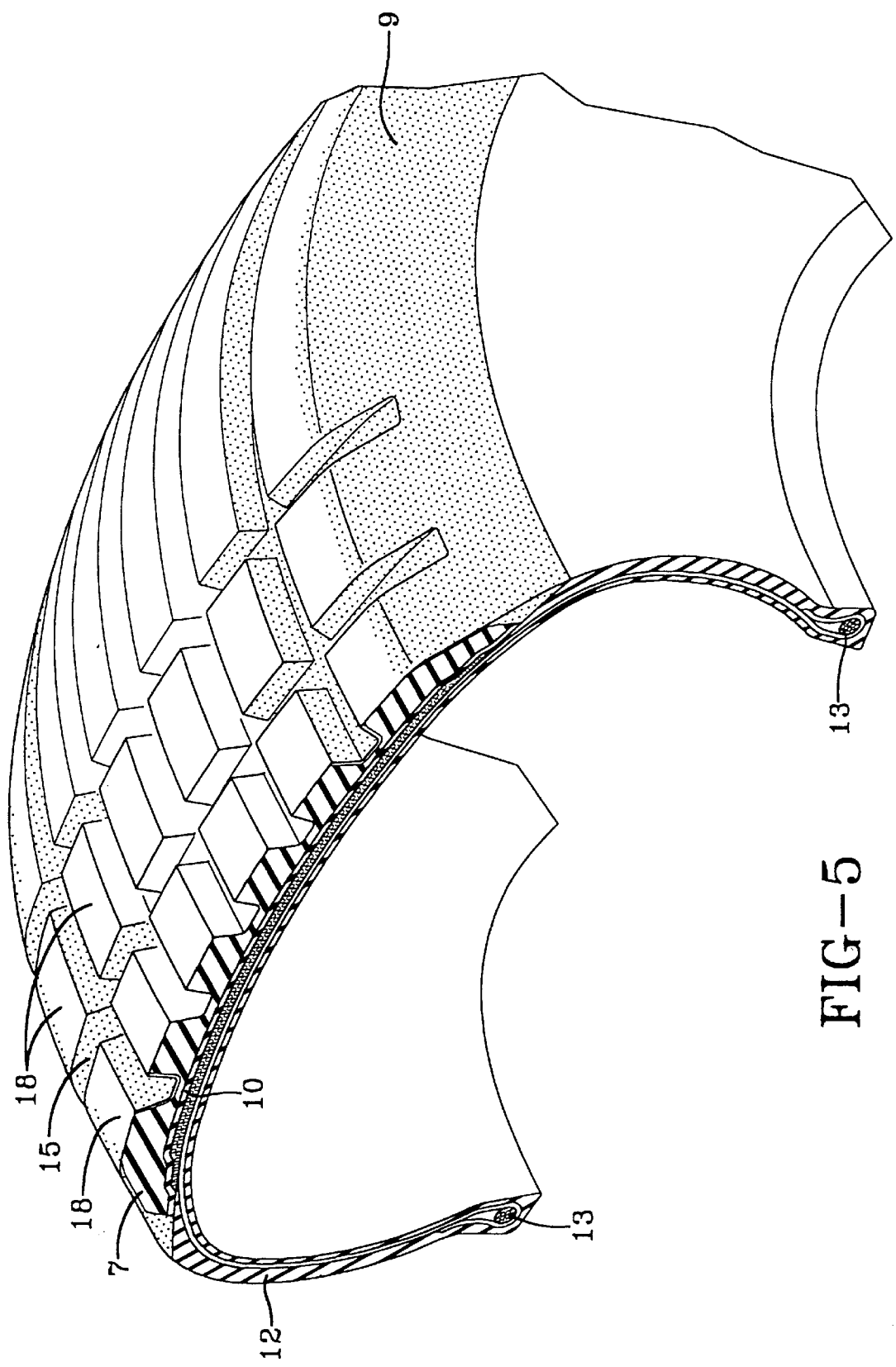
FIG. 5 is similar to FIG. 4 except that it depicts a portion of the aforesaid outer rubber layer being worn, or buffed, away from the outer surface of the tread lugs.

The tire construction, as depicted in FIG. 3 with the dual-extruded tread built onto the tire carcass, is shaped and vulcanized in a suitable mold to form a tire as depicted in FIGS. 4 and 5 having a tread configured with what is referred to herein as lugs 14 and grooves 15. The said dual-extruded tread layer 9 of the said substantially encompassing rubber layer, which becomes co-vulcanized with the tire, is shown as the aspect of the invention which covers the outer surface and walls of the lugs 14 and the bottoms of the grooves 15 as an extension of the carbon black reinforced rubber of the said miniwings 8 which now overlays a part of the tire sidewall 12 located in the shoulder region of the tire where the tread and sidewalls 12 join.

As the tire, having been mounted and inflated on a suitable electrically conductive rigid metal rim, itself mounted on a wheel of a vehicle, rolls across the ground, a path for electrical dissipation, is created between the rim to the tread, and thereby the ground, by the aforesaid electrically conductive top cap layer as it contacts at least one other carbon black reinforced rubber component of the tire.

As the said outer top cap 9 on the outer, ground-contacting surfaces of the tread lugs 14 wears away to present a part 18 of the underlaying tread cap 7 an electrical path between the ground and shoulder of the tire is maintained by the said outer cap 9 on the walls of the tread lugs 15 which themselves contact the ground, and further via connecting groove path which extends to the said carbon black reinforced carcass of the tire.

It is important to appreciate the invention, as depicted by the aforesaid drawings, is presented without an electrically conductive element, or strip, such as for example a quantitatively carbon black reinforced rubber composition, positioned entirely within the silica reinforced tread, including between the tread and tread wings, and extending from the outer surface of such tread to a quantitatively carbon black reinforced portion of the tread carcass or tread base to thereby create a path of reduced electrical resistance.

In practice, the commonly employed siliceous pigments used in rubber compounding applications are preferably precipitated siliceous pigments (referred to herein as silica).

The siliceous pigments preferably employed in this invention are precipitated silicas such as, for example, those obtained by the acidification of a soluble silicate, e.g., sodium silicate.

The siliceous pigment (silica) should, for example, have an ultimate particle size in a range of 50 to 10,000 angstroms, preferably between 50 and 400 angstroms. The BET surface area of the pigment, a measurement using nitrogen gas, is preferably in the range of about 50 to about 300 preferably about 120 to about 200 square meters per gram. The BET method of measuring surface area is described in the *Journal of the American Chemical Society*, Volume 60, page 304 (1930), although instruments are now provided by one or more manufacturers which more conveniently provide nitrogen absorption surface area measurements approximating the more cumbersome or involved and detailed BET measurement described in the aforesaid literature reference.

The silica also typically has a dibutylphthalate (DBP) absorption value in a range of about 100 to about 400 and usually in a range of about 150 to about 300.

The silica might be expected to have an average ultimate particle size, for example, in a range of about 0.01 to 0.05 micron as determined by the electron microscope, although the silica particles may be even smaller in size.

Various commercially available silicas may be considered for use in this invention such as, for example, only and without limitation, silicas commercially available from PPG Industries under the Hi-Sil trademark with designations 210, 243 etc; silicas available from Rhone-Poulenc, such as, for example, Zeosil 1165MP and silicas available from Degussa AG with designations such as, for example, VN2 VN3 and BV3370GR and from J. M. Huber as Zeopol 8746.

When silica reinforcement, particularly quantitative silica reinforcement, is desired for a rubber tire tread, particulate, precipitated silica is conventionally used with a coupling agent, or what is sometimes referred to as a silica coupler.

Compounds capable of reacting with both the silica surface and the rubber elastomer molecule, in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber interactive component of the coupling agent combines with the rubber itself.

Numerous coupling agents are taught for use in combining silica and rubber, such as for example, silane coupling agents containing a polysulfide component, or structure, such as for example bis-(3-trialkoxysilylalkyl) polysulfides containing from 2 to about 8 connecting sulfur atoms in the sulfidic bridge representative of which is, for example, bis-(3-triethoxysilylpropyl) polysulfide containing an average of about 3.5 to about 4 connecting sulfur atoms in its sulfidic bridge which is sometimes referred to as a tetrasulfide.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 7 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 5 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5 sometimes from 2 to 2.5 being preferred.

Accelerators are used to control the time and/or temperature required for vulcanization and to improve the properties of the vulcanizate. Retarders are also used control the rate of vulcanization. In one embodiment, a single accelerator system may be used, i.e., primary accelerator. Conventionally and preferably, a primary accelerator(s) is used in total amounts ranging from about 0.5 to about 4 alternatively about 1 to about 2 phr. In another embodiment, combinations of a primary and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to a tire with a tread outer cap of carbon black reinforced rubber over a silica reinforced portion of the tread to provide a path of relatively low electrical resistance from the outer surface of the tread to the bead portion of the tread.

The tire can be built, shaped, molded and cured by various methods which will be readily apparent to those having skill in such art.

The composition of the miniwing/tread base rubber composition used in this invention, and also the tread cap top layer extension of the miniwing(s), is developed in order to obtain the tear, wet performance and flex properties desired, or required, for a tire component located, or positioned, in these areas of the tire. A typical rubber formulation contains a blend of natural rubber (natural cis 1,4-polyisoprene rubber), emulsion polymerization prepared styrene/butadiene copolymer rubber (E-SBR), and cis 1,4-polybutadiene rubber. The natural rubber is used to enhance rubber tear resistance, the E-SBR is used to enhance wet tread performance (wet traction), and the polybutadiene rubber is used to enhance flex properties. The content of carbon black in the rubber composition is optimized to obtain reinforcement and flex properties. A carbon black content in a range of about 50 to about 80 phr is usually considered satisfactory. Other conventional rubber compounding ingredients are added to the rubber composition as are customary for sulfur curable rubber compositions for tires.

In one aspect of the practice of this invention, it is important to appreciate that, since the said tread top cap layer is to be an extension of the tread wings as a unitary rubber composition, the tread wings rubber composition is prepared with properties more closely aligned with tire tread properties. This is considered to be a departure from conventional past practice where the tread wings, particularly for a tread-over-sidewall tire construction, are prepared with properties, and associated rubber composition, more closely aligned with the tire sidewall rubber composition over which the tread wings overlap.

The invention may be better understood by reference to the following examples in which the parts and percentages are by weight unless otherwise indicated.

EXAMPLE I

Electrical resistance of a tire, for the purposes of this invention, is measured with the assistance of an electrically conductive rigid metal (steel, for example) rim onto which the tire is mounted to create a tire/rim assembly, a flat steel plate onto which the tire of the tire/rim assembly is pressed, and an instrument for measuring the associated electrical resistance between the rim and the aforesaid steel plate.

The test prescribed herein is designated herein, for the purposes of this description as a loaded electrical resistance test which, for convenience, may be referred to herein as Test GT-L. Such test is not, at this time, a prescribed ASTM or tire industry association test procedure.

Apparatus and Procedure:
 1. flat steel plate having a thickness of at least about 5 mm and a length and width greater than the footprint of the tire to be tested;
 2. an electrically insulative, electrically non-conductive plate (polyethylene, for example) at least as long and wide as aforesaid steel plate and positioned beneath and against the steel plate—whereby the insulation resistance from the steel plate through the insulative plate being at least 100 times greater than the measured test value for the electrical resistance between the tire tread (eg. the aforesaid steel plate) and the steel rim of the aforesaid tire/rim assembly;
3. voltage source of at least 100 volts and power within 0.01 and 3 watts and resistance meter instrumentation for reading resistance in ohms or megohm with an accuracy of+/−10 percent;
4. appropriate copper connective wiring;
   (a) from the steel rim of the tire/rim assembly copper strip to the resistance instrumentation; and
   (b) from the steel plate to the resistance instrumentation;
5. tire to be tested;
6. electrically conductive steel wheel rim; and
7. apparatus for pressing the tire/rim assembly against the steel plate and associated pressure measuring instrument.

According to the test procedure, the tire is mounted on a steel rim and inflated with air pressure to 100 percent of test pressure of about 2.2 bar which is considered herein as being standard for radial passenger tires.

Prior to testing, the tire is inflated, on the steel rim, to the test pressure and for at least 8 hours at ambient temperature between 15 and 30° C. at a relative humidity of less than 60 percent.

A test load is applied to the tire/rim assembly against the aforesaid steel plate in an amount equal to 80 percent of the load indicated for the tire by its load index.

The tire/rim assembly is loaded, as described above, twice within one minute. Then the assembly is loaded for a third time for a duration of three minutes after which the electrical measurements are taken and reported in ohms or megohms resistance between the rim and the steel plate beneath the loaded tire tread. This procedure is repeated at least three times at approximately equal spaced locations around the tire.

EXAMPLE II

Pneumatic rubber tires, identified herein as Tires A, B and C, are prepared of a 185/70/R14 type and size. All of the tires have identical carbon black reinforced rubber carcasses with associated beads and sidewalls. The tires were of a tread and tread-wing construction, with the tread itself being of cap/base construction. All of the treads have the same surface configuration of lugs and grooves, with the grooves connecting with the tires' sidewalls in the shoulder region.

Tire "A" is considered herein as a control with a tread construction composed of a dual extrusion of (i) a tread cap and (ii) tread base and two spaced apart tread wings individually adjuxtapositioned to the tread at the tread's axial outer edges and each overlapping a portion of its associated sidewalls; wherein the tread cap rubber is quantitatively reinforced with silica and containing a minimal of carbon black and where the tread base and tread wing rubber is quantitatively reinforced with carbon black and without silica.

The tires "B" and "C" had a similar dual extrusion tread construction except that the extrusion (ii) also contained an extension of the tread wing as a thin rubber layer extending over and integral with a portion of the outer surface of the said tread cap extrusion (i) and covering at least a portion of the outer surface of the tread cap intended to be ground-contacting.

All of the tires, after vulcanization in a suitable mold, had a tread of a lug and groove configuration.

While, for the purposes of this example, the tire treads are described as being of cap/base construction, such a construction being considered as a viable tread construction and that the construction illustrated by this Example adequately describes a best mode of practicing the invention. For such cap/base construction for the tread, the tread base may be either of the aforesaid dual extrusion where it is a part of the (ii) tread wing and outer tread layer extrusion and thereby of the same and consistent, or unitary, rubber composition or the tread base may be of a different rubber composition from either the tread of tread wing rubber and formed by (1) a tri-extrusion of the tread, wing and base rubber compositions or by (2) applying the tread base as an additional rubber layer to the dual extrusion or the tread and tread wings with the aforesaid outer tread layer extension The tire identified herein as Tire "C" is the same as Tire "B" except that an outer portion of the vulcanized tread lugs, and the accompanying outer layer of co-extruded layer extending from the tread wings has been buffed away, thus, exposing the silica reinforced tread rubber of the outer lug surface of the tire tread.

The tires are evaluated for their electrical resistance by the aforesaid loaded electrical resistance test "GT-L Test".

The compositions for the respective tread, tread wings and outer tread layer extending from the tread wings are comprised of the materials shown in the following Tables 1–2.

In particular, Control Tire A's tread is a dual extrusion of the (i) tread rubber composition shown in Table 1 and (ii) tread base and miniwings rubber composition of Table 2 without tread outer layer.

Tires "B" and "C" treads are a dual-extrusion of (i) the tread rubber composition shown in Table 1 and (ii) tread base, miniwings and outer tread cap layer shown in Table 2.

As hereinbefore pointed in this Example, Tire "B" is the same as Tire "C" except that tire C has the outer surfaces of its tread lugs buffed away, thus removing the top tread cap layer from the outer surfaces of the lugs, thereby leaving the outer tread cap layer on the sides of the lugs in the tread grooves.

The aforesaid dual-extruded treads are suitably built onto the tire carcasses and the assembly thereof vulcanized in a tire mold at a temperature of about 160° C. for about 15 minutes to form cured pneumatic tires with tread configurations of lugs and grooves.

TABLE 1

(Tread)

| Tires A, B and C | Parts |
|---|---|
| Non-Productive Mix Stages | |
| E-SBR[1] | 25 |
| Isoprene/Butadiene[2] Rubber | 45 |
| BR[3] | 20 |
| Natural Rubber[4] | 10 |
| Processing Aids[5] | 25 |
| Fatty Acid | 2 |
| Silica[7] | 80 |
| Carbon Black, Tread Type | 0 |
| Coupling Agent[8] | 12 |

TABLE 1-continued (Tread)

| Tires A, B and C | Parts |
|---|---|
| Productive Mix Stage | |
| Sulfur | 1 |
| Zinc Oxide | 4 |
| Antioxidant(s)[6] | 3 |
| Sulfenamide and Thiuram Type Accelerators | 4 |

[1]Emulsion polymerization prepared SBR obtainable from The Goodyear Tire & Rubber Company having styrene content of about 40 percent.
[2]Isoprene/butadiene copolymer elastomer having a Tg of about −45° C. and an isoprene content of about 50 percent obtained from The Goodyear Tire & Rubber Company.
[3]Cis 1,4-polybutadiene rubber obtained as Budene ® 1207 from The Goodyear Tire & Rubber Company.
[4]Natural rubber (cis 1,4-polyisoprene).
[5]Rubber processing oil as being about 9.4 parts in the E-SBR, where the amount of E-SBR is reported above on a dry weight (without the oil) and in addition, about 15 parts additional rubber processing oil, plasticizers, resins and waxes were added.
[6]Of the di-aryl paraphenylene diamine and dihydro-trimethyl quinoline type.
[7]A silica obtained as Zeosil 1165MP from Rhone-Poulenc.
[8]obtained as bis-3-(triethoxysilylpropyl)tetrasulfide (50% active) commercially available as X50S from Degussa as a 50/50 blend of the tetrasulfide with N330 carbon black (thus, considered 50% active).

TABLE 2

(Miniwings, Tread Base & Tread Outer Layer)

| Materials | Tire A | Tires B & C |
|---|---|---|
| Non-Productive Mix Stages | | |
| E-SBR[1] | 0 | 30 |
| Natural Rubber[2] | 40 | 40 |
| Cis 1,4-Polybutadiene Rubber[3] | 60 | 30 |
| Processing Aids[4] | 20 | 40 |
| Fatty Acid | 2 | 2 |
| Carbon Black, N550 (BET = 42 m²/g) | 50 | 70 |
| Productive Mix Stage | | |
| Sulfur | 2.5 | 2.5 |
| Zinc Oxide | 2 | 2 |
| Antioxidant(s)[5] | 5.5 | 5.5 |
| Sulfenamide and Thiuram Type Accelerators | 1 | 1 |

[1]Emulsion polymerization prepared SBR obtainable from The Goodyear Tire & Rubber Company having styrene content about 23 percent reported herein on a dry weight basis.
[2]Natural rubber (cis 1,4-polyisoprene).
[3]Cis 1,4-polybutadiene rubber obtained as Neocism ™ BR 40 from Enichem.
[4]Rubber processing oil as about 10 parts in the E-SBR, where the amount of E-SBR is reported above on a dry weight (without the oil), and including rubber processing oil and waxes; as well as plasticizer and resin for Tires B and C.
[5]Of the di-aryl paraphenylene diamine and dihydro-trimethyl quinoline type.

Electrical resistance measurements were conducted on Tires A, B and C using the hereinbefore described loaded electrical resistance test "GT-L Test". The results of the tests (average values) are shown in the following Table 3.

TABLE 3

| Tire | Electrical[1] Resistance |
|---|---|
| A (Control) | 27,000 |
| B | 8.3 |
| C | 7.0 |

[1]Megohms.

These electrical resistance measurements demonstrate that, for the tire with tread of quantitatively silica reinforced rubber, the application of the dual-extruded, co-vulcanized, integral quantitatively carbon black reinforced rubber top tread cap layer extending from and as a part of the miniwings over the outer surface of the tread intended to be ground-contacting can significantly reduce the electrical resistance of the tire between its outer tread surface and its inner bead portion.

In the description of this invention, in some instances a tri-extrusion or tri-extrusion process is referred to. It is recognized that, in conventional practice such extrusion or extrusion process is often referred to as a triplex extrusion or triplex extrusion process.

In the practice of this invention, precipitated silica is prescribed as a rubber reinforcing filler. It is to be understood that when such silica is used in the practice of this invention as a reinforcing filler, it is used in combination with a silica coupler.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire composed of a carbon black reinforced rubber carcass having two individual sidewalls, and two spaced apart bead portions and a circumferential rubber tread construction composed of a tread cap designed to be road-contacting, underlying tread base and pair of spaced apart tread wings each individually positioned juxtapositioned to and extending axially outwardly from opposite sides of the tread cap to overlap at least a portion of the outer surface of each of the two sidewalls of the tire carcass; wherein said tread construction is comprised of co-extruded sulfur vulcanizable rubber laminae composed of (i) said tread cap designed to be road-contacting, (ii) said underlying tread base, and (iii) said tread wings; wherein each of said tread wings has an extension, said extension being a thin, outer rubber composition layer integral with and extending from the tread wing and integral with and covering at least a portion of the outer surface of the tread cap designed to be ground- contacting; wherein said tread cap contains about 30 to about 100 phr of precipitated silica and optionally up to about 20 phr of carbon black; and wherein said tread wings and said thin, outer rubber composition layers are of a unitary rubber composition and contain about 25 to about 100 phr of carbon black having a BET value in a range of about 30 to about 1000 m²/g; each said thin, outer rubber composition layer extends to a location about 20 to about 80 percent of the distance from the inner edge of the tread wing to the centerline of the tread construction and has a thickness in a range of about 0.01 to about 0.5 mm.

2. The tire of claim 1 wherein said tread cap has an electrical resistance greater than 20,000 megohms and said outer rubber composition layer has an electrical resistance of less than 100 megohms.

* * * * *